US011983629B1

(12) United States Patent
Margolin

(10) Patent No.: US 11,983,629 B1
(45) Date of Patent: May 14, 2024

(54) PRIOR INJECTIONS FOR SEMI-LABELED SAMPLES

(71) Applicant: Intuit Inc., Mountain View, CA (US)

(72) Inventor: Itay Margolin, Petach Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/977,964

(22) Filed: Oct. 31, 2022

(51) Int. Cl.
*G06N 3/08* (2023.01)
*G06F 18/214* (2023.01)

(52) U.S. Cl.
CPC ........... *G06N 3/08* (2013.01); *G06F 18/2155* (2023.01)

(58) Field of Classification Search
CPC ..... G06N 3/08; G06N 3/0895; G06F 18/2155
See application file for complete search history.

(56) References Cited

U.S. PATENT DOCUMENTS

| | | | | |
|---|---|---|---|---|
| 2019/0236412 | A1* | 8/2019 | Zhao | G06F 18/24 |
| 2022/0198339 | A1* | 6/2022 | Zhao | G06F 18/214 |
| 2022/0309292 | A1* | 9/2022 | Albrecht | G06V 30/226 |
| 2023/0260182 | A1* | 8/2023 | Saito | G06T 13/205 |
| | | | | 345/474 |

OTHER PUBLICATIONS

Gao et al., "Deep Label Distribution Learning With Label Ambiguity", 2017, IEEE Transactions on Image Processing, vol. 26, No. 6, pp. 2825-2838. (Year: 2017).*
Sun et al., "Unsupervised Cross Domain Person Re-Identification by Multi-Loss Optimization Learning", 2021, IEEE Transactions on Image Processing, vol. 30, pp. 2935-2946. (Year: 2021).*
Polanitzer, "The Minimum Mean Absolute Error (MAE) Challenge", Mar. 22, 2022, https://medium.com/@polanitzer/the-minimum-mean-absolute-error-mae-challenge-928dc081f031 pp. 1-39. (Year: 2022).*

* cited by examiner

*Primary Examiner* — Benjamin P Geib
(74) *Attorney, Agent, or Firm* — Paradice & Li LLP

(57) ABSTRACT

Systems and methods for training machine learning models are disclosed. An example method includes receiving a semi-labeled set of training samples including a first set of training samples, where each training sample in the first set is assigned a known label, and a second set of training samples, where each training sample in the second set has an unknown label, determining a first loss component, the first loss component providing a loss associated with the first set, determining a second loss component, the second loss component having a value which increases based on a difference between a distribution of individually predicted values of at least the second set and an expected overall distribution of at least the second set, and training the machine learning model, based on the first loss component and the second loss component, to predict labels for unlabeled input data.

17 Claims, 4 Drawing Sheets

PRIOR INJECTIONS FOR SEMI-LABELED SAMPLES

TECHNICAL FIELD

This disclosure relates generally to methods for training machine learning models, and more specifically to the training of machine learning models to predict labels based on incompletely labeled training data.

DESCRIPTION OF RELATED ART

Machine learning techniques are frequently used to predict values for inputs based on training data. In order for a trained machine learning model to function effectively, appropriate training data and training techniques are required. However, it is often the case that such training data is incomplete, particularly with respect to one or more labels. For example, some labels are easier to assign than others, such as it being generally easier to determine that a user likes a song as compared with determining that the user dislikes a song. This may lead to training data which is heavily imbalanced in the favor of the more easily obtained labels. Training a machine learning model based on such training data may result in an inaccurate and ineffective trained model.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for training a machine learning model to predict labels for input data. An example method is performed by an electronic device coupled to a machine learning model and includes receiving a semi-labeled set of training samples including a first set of training samples, where each training sample in the first set is assigned a known label, and a second set of training samples, where each training sample in the second set has an unknown label, determining a first loss component, the first loss component providing a loss associated with the first set, determining a second loss component, the second loss component having a value which increases based on a difference between a distribution of individually predicted values of at least the second set and an expected overall distribution of at least the second set, and training the machine learning model, based on the first loss component and the second loss component, to predict labels for unlabeled input data.

In some aspects, the known label assigned to each training sample of the first set of training samples is a first value of a binary label, and each training sample of the second set of training samples has an unknown label including either the first value of the binary label or a second value of the binary label. In some aspects, the first loss component has a value of zero for each training sample of the second set of training samples. In some aspects, the first loss component is given by $$PositiveLoss(y, \hat{y}) = \frac{1}{P}\sum_{\forall i \text{ where } y_i=1}(1 - \hat{y}_i),$$

where $\gamma$ is a vector of length N, where each element $\gamma_i$ in $\gamma$ has a value of 1 for training samples belonging to the first set of training samples, and a value of −1 for training samples belonging to the second set of training samples, and $\hat{\gamma}$ is a vector of length N, such that each element $\hat{\gamma}_i$ in $\hat{\gamma}$ has a value between 0 and 1 corresponding to a probability that the corresponding training sample is assigned the first value of the binary label by the machine learning model. In some aspects, the expected distribution of at least the second set of training samples includes an expected proportion of the training samples in the semi-labeled set having the first value of the binary label. In some aspects, the expected proportion is given by $$R_{eff} = \frac{P + R * U}{N},$$

where P is the number of training samples in the first set of training samples, U is the number of training samples in the second set of training samples, N is a total number of training samples in the semi-labeled set of training samples, and R is the proportion of the training samples in the second set of training samples having the first value of the binary label. In some aspects, the second loss component is given by $$DistributionLoss(\hat{y}) = \left(\left(\frac{1}{N}\sum_{i=1}^{N}\hat{y}_i\right) - R_{eff}\right)^2,$$

where $\hat{\gamma}$ is a vector of length N, such that each element $\hat{\gamma}_i$ in $\hat{\gamma}$ has a value between 0 and 1 corresponding to a probability that the corresponding training sample is assigned the first value of the binary label by the machine learning model.

In some aspects, the machine learning model is trained in block 308 based on a sum of the first loss component and the second loss component.

In some aspects, the machine learning model is a deep neural network (DNN).

In some aspects, the known label assigned to each training sample of the first set of training samples is a corresponding value of a continuous label, and each training sample of the second set of training samples has an unknown value of the continuous label. In some aspects, the expected overall distribution of labels of at least the second set of training samples includes a known distribution of labels in the second set of training samples. In some aspects, the known distribution of labels includes a normal distribution having a known mean $\mu$ and a known standard deviation G. In some aspects, the first loss component is a mean absolute error loss component providing a loss for the first set of training samples. In some aspects, the mean absolute error loss component is given by $$LabeledLoss(y, \hat{y}) = \frac{1}{N_L}\sum_{i=1}^{N_L}|\hat{y}_i - y_i|,$$

where $\gamma$ is a vector of length $N_L$, where each element $\gamma_i$ in $\gamma$ has a known value of the continuous label corresponding to the ith training sample of the first set of training samples, $\hat{\gamma}$ is a vector of length $N_L$, such that each element $\hat{\gamma}_i$ in $\hat{\gamma}$ has a predicted value of the continuous label corresponding to the ith training sample of the first set of training samples, and $N_L$ represents a total number of training samples in the first set of training samples. In some aspects, the second loss component provides a loss for the second set of training samples. In some aspects, the second loss component is given by $$UnlabeledLoss(\hat{y}) = \left(\left(\frac{1}{N_U}\sum_{i=1}^{N_U}\hat{y}_i\right) - \mu\right)^2 + \left(\left(\frac{1}{N_U - 1}\sum_{i=1}^{N_U}(y_i - \mu)^2\right) - \sigma^2\right)^2,$$

where $\hat{\gamma}$ is a vector of length $N_U$, such that each element $\hat{\gamma}_i$, in $\hat{\gamma}$ has a predicted value of the continuous label corresponding to the ith training sample of the second set of training samples, and $N_U$ represents a total number of training samples in the second set of training samples.

Another innovative aspect of the subject matter described in this disclosure can be implemented in a system for training a machine learning model to predict labels for input data. An example system may be associated with a machine learning model and include or more processors, and a memory storing instructions for execution by the one or more processors. Execution of the instructions causes the system to perform operations including receiving a semi-labeled set of training samples including a first set of training samples, where each training sample in the first set is assigned a known label, and a second set of training samples, where each training sample in the second set has an unknown label, determining a first loss component, the first loss component providing a loss associated with the first set, determining a second loss component, the second loss component having a value which increases based on a difference between a distribution of individually predicted values of at least the second set and an expected overall distribution of at least the second set, and training the machine learning model, based on the first loss component and the second loss component, to predict labels for unlabeled input data.

Another innovative aspect of the subject matter described in this disclosure can be implemented in a method for predicting labels for input data. An example method is performed by an electronic device coupled to a machine learning model and includes receiving a semi-labeled set of training samples including a first set of training samples, where each training sample in the first set is assigned a known label, and a second set of training samples, where each training sample in the second set has an unknown label, wherein the known label assigned to each training sample of the first set of training samples is a first value of a binary label, and each training sample of the second set of training samples has an unknown label comprising either the first value of the binary label, or a second value of the binary label, determining a first loss component, the first loss component providing a loss associated with the first set, determining a second loss component, the second loss component having a value which increases based on a difference between a distribution of individually predicted values of at least the second set and an expected overall distribution of at least the second set, training the machine learning model, based on the first loss component and the second loss component, to predict labels for unlabeled input data, training the machine learning model, based on the first loss component and the second loss component, to predict labels for unlabeled input data, receiving one or more input data samples, and predicting, using the trained machine learning model, a corresponding label for each input data sample of the one or more input data samples.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
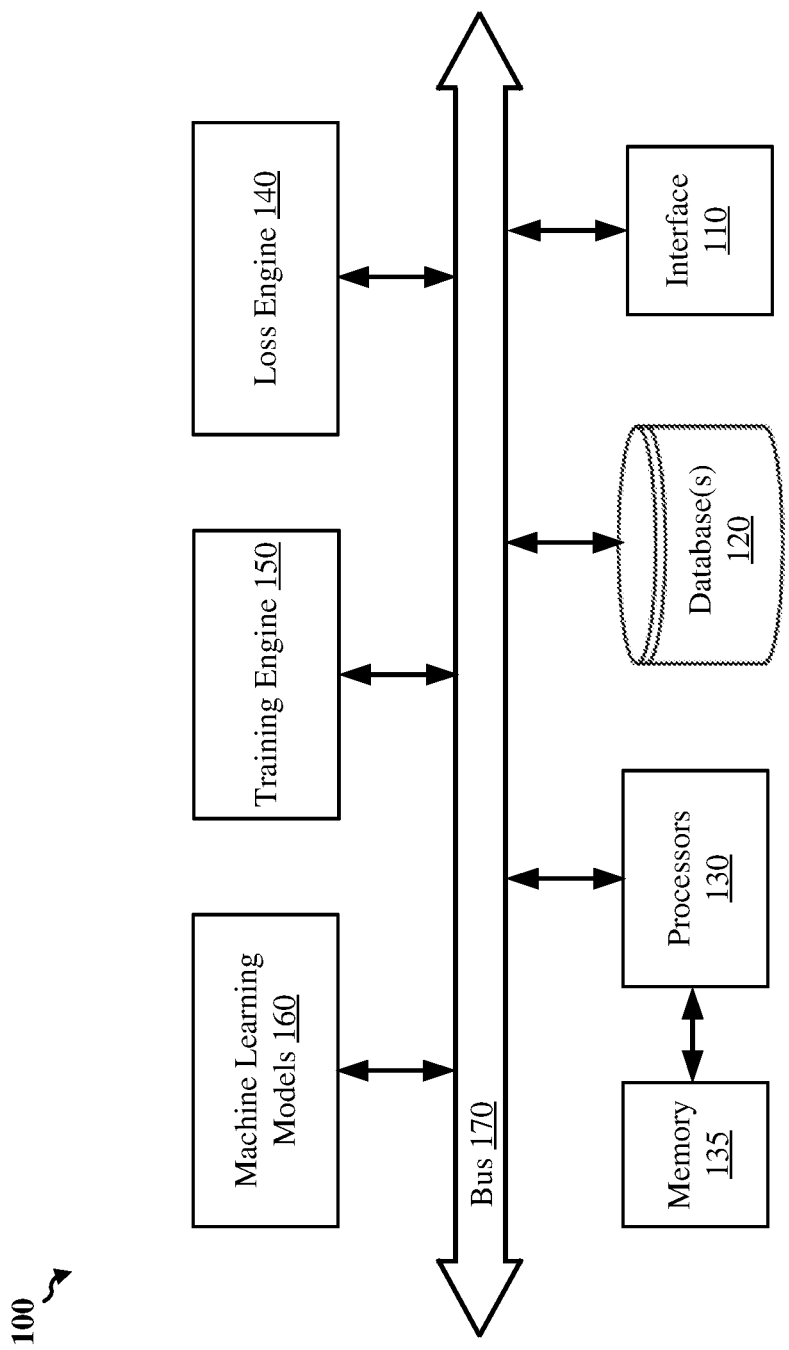
FIG. 1 shows a machine learning training system, according to some implementations.

In order to train machine learning models, such as neural networks, deep neural networks (DNNs), regression models, tree-based machine learning models, and on, to make accurate predictions, a large number of tagged, or labeled, samples of training data may be required. In a number of scenarios, samples of training data for one label may be significantly easier to obtain as compared to another label. For example, consider recommendation systems, where it may be much easier to determine that a user likes a song, video, software, etc., than it is to determine that the user dislikes a song, video, software. In such scenarios, the training data may be significantly unbalanced, for example including significantly more, or even entirely including samples of training data labeled as "liked" as compared to "disliked." Another example may be the prediction of user dissatisfaction with a product or service, in that while it may be easy to determine that users who write complaints about the product or service are dissatisfied, it may be much harder to determine whether users who do not write complaints are dissatisfied. A further example may be the prediction of a user's need for a product or service offered by a company, in that it is easy to determine that users who use and continue to use the product or service have a need for it, but it is much harder to determine when a user who does not use the product or service nevertheless has a need for it. An additional example may include predicting whether a medical intervention may be beneficial for a patient, where positive results may be significantly easier to label, but negative results may be far more incomplete. In many cases, the training data may include such "liked" (or otherwise labeled) samples and "unknown" samples, that is, the training data may include a plurality of positively labeled samples, and a plurality of unlabeled samples which may each be positive or negative. In other words, for such training data no samples labeled as "disliked" due to the difficulty of obtaining such data. The imbalanced nature of the training data may significantly impair accurate and efficient training of machine learning models.

Some conventional techniques may mark the unlabeled samples as negative. However, while this may work when positive labels are rare in the underlying data, this is often not the case, and use of such techniques may result in significant rates of misclassification by the trained machine learning model. Some other conventional techniques may train an ensemble of models by oversampling the positively labeled training data. For such techniques multiple models may each be trained using all of the positively labeled samples of the training data and may each be trained with a different sample of the unlabeled data, which may be treated as negatively labeled. While these techniques may be better than training a single model while treating all unlabeled samples as negative, significant additional computational resources are required, and the resulting trained models may still not be very accurate. Finally, some other conventional techniques may manually label the unlabeled samples. However, this may require significant human labor, which may be costly and time consuming. It would therefore be desirable to more efficiently and accurately train machine learning models using unbalanced training data.

Implementations of the subject matter described in this disclosure may be used to more accurately train machine learning models using incompletely labeled training data. More particularly, information about a distribution of a data set may be used in combination with this incompletely labeled training data to train the machine learning model to predict labels for input data. As an example, consider a binary label, including either a positive or a negative label. In a number of scenarios it may be much easier to determine when the positive label should be applied as compared with a negative. However, an approximate rate of positivity for the overall data set may be known. The example implementations may train the machine learning model using such training data and the positivity rate. This approach may be extended to continuous labels, where the training data includes a first plurality of labeled samples and a second plurality of unlabeled samples, where an approximate distribution of the unlabeled samples is known. As discussed in more detail below, the labeled samples and the known or approximately known distribution may be used to train the machine learning model. After the machine learning model has been trained using these techniques, the trained machine learning model may receive input data, and predict labels for the input data based on the training. These, and other aspects of the example implementations are discussed further below.

Various implementations of the subject matter disclosed herein provide one or more technical solutions to the technical problem of training machine learning models using incomplete or imbalanced training data. As discussed above, conventional techniques may uniformly label unknown samples of the training data, such as marking all unknowns as negative, may oversample the labeled samples of the training data, or may manually label the unlabeled samples. However, such techniques may lead to misclassification, may require significantly more computational resources, or may require significant time and human intervention. In contrast, the present implementations may train a machine learning model using the imbalanced training data and approximate knowledge of the distribution of labels in order to train the machine learning model more efficiently and may result in a trained model which more accurately predicts labels for subsequent inputs. More specifically, various aspects of the present disclosure provide a unique computing solution to a unique computing problem that did not exist prior to the use of machine learning models for predicting complicated interactions, such user interactions. As such, implementations of the subject matter disclosed herein are not an abstract idea such as organizing human activity or a mental process that can be performed in the human mind—indeed, the human mind is not capable of training a machine learning model.

Moreover, various aspects of the present disclosure effect an improvement in the technical field of machine learning prediction. Training the machine learning model using a significantly unbalanced set of training data, based on the unbalanced training data and approximate knowledge of the underlying distribution of labels cannot be performed in the human mind, much less using pen and paper.

FIG. 1 shows a machine learning training system 100, according to some implementations. The machine learning training system 100 is shown to include an input/output (I/O) interface 110, a database 120, one or more data processors 130, a memory 135 coupled to the data processors 130, a loss engine 140, a training engine 150, and one or more machine learning models 160. In some implementations, the various components of the machine learning training system 100 may be interconnected by at least a data bus 170, as depicted in the example of FIG. 1. In other implementations, the various components of the machine learning training system 100 may be interconnected using other suitable signal routing resources.

The interface 110 may include a screen, an input device, and other suitable elements that allow a user to provide information to the machine learning training system 100 and/or to retrieve information from the machine learning training system 100. Example information that can be provided to the machine learning training system 100 may include configuration information for the machine learning training system 100, such as training data for the machine learning models 150, and expected distribution data for input data and training data associated with the machine learning training system 100. Example information that can be retrieved from the machine learning training system 100 may include data representing a machine learning model trained by the machine learning training system 100, prediction data generated by the machine learning training system 100, such as predicted labels for input data provided to a machine learning model trained by the machine learning training system 100, and the like.

The database 120, which may represent any suitable number of databases, may store any suitable information pertaining to training and input data for the machine learning models 150, configuration information for the machine learning training system 100, historical distribution data associated with input data and training data associated with the machine learning training system 100, one or more rules or algorithms for training the machine learning models 160, or the like. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the machine learning training system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The loss engine 140 may generate multiple loss components for training the machine learning models 160 of the machine learning training system 100. More particularly, the loss components may include a first loss component providing a penalty associated with prediction of the labeled samples. More particularly, the first loss component may penalize a machine learning model for errors in predicting labels of the labeled samples of the training data. The loss components may also include a second loss component providing a penalty associated with the expected distribution of the input data. More particularly, the second loss component may penalize the machine learning model based on a difference between a distribution of the model's predicted labels and the expected distribution of the input data.

The training engine 150 may train the machine learning models 160 to predict labels for input data based on the training data and the loss components determined by loss engine 140. The training data may, for example be stored in the database 120.

The machine learning models 160 may include any number of machine learning models that can be used to predict labels to assign to input data provided to the machine learning models 160. A machine learning model can take the form of an extensible data structure that can be used to represent sets of words or phrases and/or can be used to represent sets of attributes or features. The machine learning models 160 may be seeded with historical data indicating relationships between field values and values of dependent fields for one or more historical users. In some implementations, the machine learning models 160 may include deep neural networks (DNNs), which may have any suitable architecture, such as a feedforward architecture or a recurrent architecture. The machine learning models 160 may predict labels to assign to input data based on the training operations performed by the training engine 150 using the loss components determined by the loss engine 140. The machine learning models 160 may be trained based on samples of training data, which may be unbalanced, such as including a first plurality of training samples which are labeled, and a second plurality of training samples which are unlabeled.

The particular architecture of the machine learning training system 100 shown in FIG. 1 is but one example of a variety of different architectures within which aspects of the present disclosure may be implemented. For example, in other implementations, the machine learning training system 100 may not include loss engine 140, the functions of which may be implemented by the processors 130 executing corresponding instructions or scripts stored in the memory 135. In some other implementations, the functions of the training engine 150 may be performed by the processors 130 executing corresponding instructions or scripts stored in the memory 135. Similarly, the functions of the machine learning models 160 may be performed by the processors 130 executing corresponding instructions or scripts stored in the memory 135.

Figure 2:
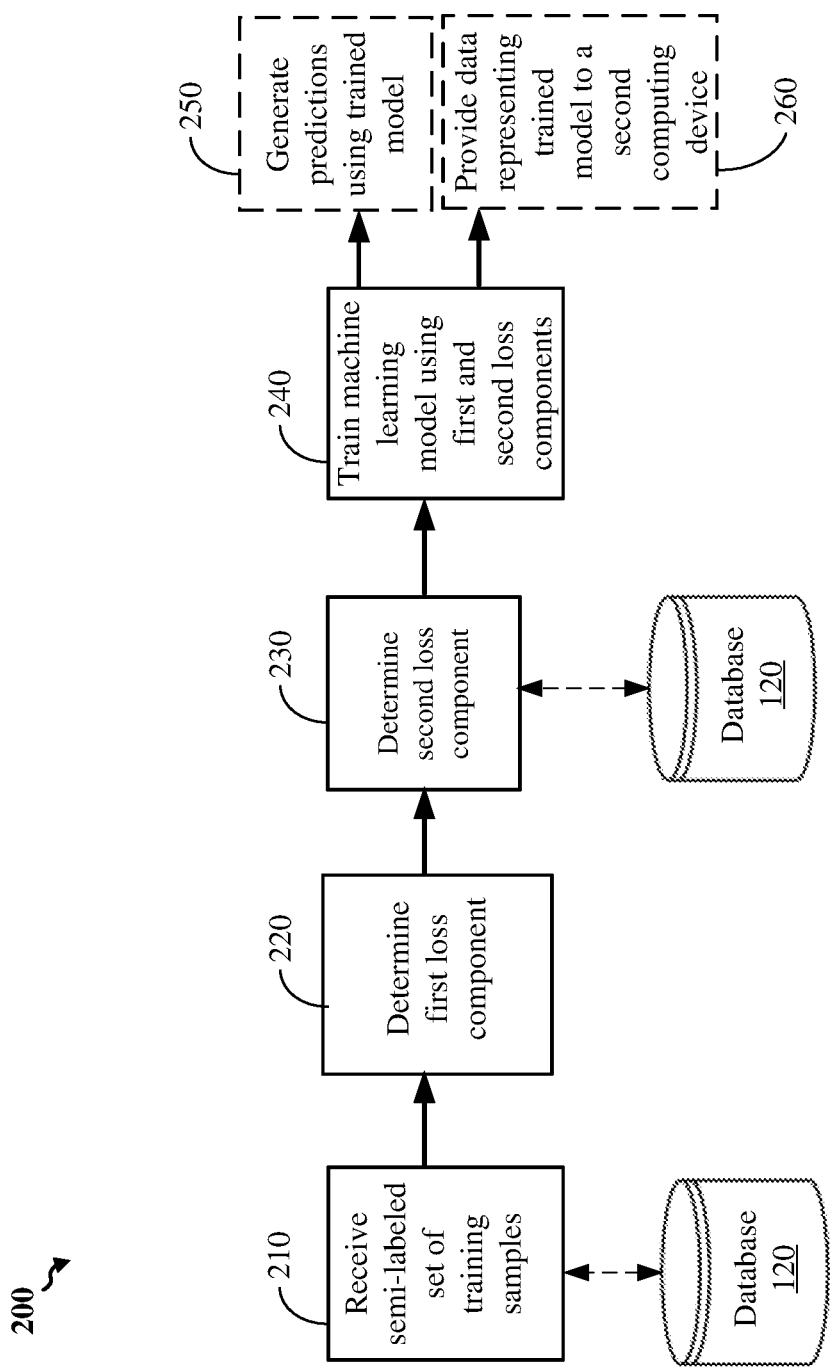
FIG. 2 shows a high-level overview of an example process flow that may be employed by the machine learning training system of FIG. 1.

FIG. 2 shows a high-level overview of an example process flow 200 that may be employed by the machine learning training system 100 of FIG. 1. In block 210, the machine learning training system receives a semi-labeled set of training samples. For example, the semi-labeled set of training samples may be received via one or more network interfaces coupled to the machine learning training system 100 or retrieved from another memory coupled to the machine learning training system 100. The semi-labeled set of training samples may include a first set of labeled training samples and a second set of unlabeled training samples. In block 220, the loss engine 140 may determine a first loss component based on the semi-labeled set of training samples. In block 230, the loss engine 140 may determine a second loss component based on the semi-labeled set of training samples. For example, the second loss component may be based on an expected distribution of the semi-labeled set of training samples, which may be for example, retrieved from the database 120 or received via one or more interfaces coupled to the machine learning training system 100. In block 240, the training engine 150 may train the machine learning model 160 based on the first and the second loss components. Optionally, in block 250, the trained machine learning model 160 may generate one more predicted labels for input data. In block 260, the machine learning training system 100 may optionally provide data representing the trained machine learning model to a second computing device. For example, after training the machine learning model 160, data representing the trained machine learning model may be sent to the second computing device so that the second computing device may generate predicted labels for input data by executing the data representing the trained machine learning model.

As discussed above, it may be difficult to train machine learning models when training data is particularly unbalanced. The example implementations improve the training of machine learning models for such unbalanced training data through the use of multiple loss factors, a first loss factor relating to the labeled training data, and a second loss factor relating to an expected distribution of at least the unlabeled training data. The use of this second loss factor, and the expected distribution, may significantly improve the efficiency of training machine learning models based on such unbalanced data sets, and improve the accuracy of predictions made by machine learning models trained using the example techniques.

Consider a set of training samples X, including samples $x_1, x_2, \ldots x_n$, where each training sample is associated with a tax $y_i$, which may be −1 or 1, where 1 indicates that the associated sample is labeled as "positive" and −1 indicates that the associated sample has an unknown label, and may be either positive or negative. For example, a sample $x_i$ having $y_i=1$ may correspond to a song a user has affirmatively liked, while another sample $x_j$ having $y_j=-1$ may correspond to a song where it is unknown whether or not the user likes the song. Note that in other implementations, another binary label may be used without loss of generality. An approximate rate R of positives in the data set is also known. The problem to be solved by the trained machine learning model may then be framed as predicting, for a new input x, whether it should be assigned the label 0 to indicate a negative, or the label 1 to indicate a positive.

The machine learning model may be trained based on a set of training samples which may be called "semi-labeled," that is, only a portion of the training samples are labeled, with the remainder being unknown. Further, in this binary example, this training data may be called "positive-unknown" because each sample of the training data is labeled as positive or has an unknown label. Thus, for a set of N training samples, there may be P positively labeled training samples and U unknowns, such that P+U=N. Because the approximate rate R is known, the effective rate of positives may be given as $$R_{\mathit{eff}} = \frac{P + R*U}{N}.$$

That is, we know approximately how many of the U unknowns should be positive, based on the expected rate of positives in the overall data set.

As discussed above, training the machine learning model, such as a deep learning model, may be based on two loss components. A first loss component may be determined to penalize the model when it fails to predict the positively labeled training data. In some implementations the first loss component may be given as $$PositiveLoss(y, \hat{y}) = \frac{1}{P}\sum_{\forall i \text{ where } y_i=1}(1 - \hat{y}_i),$$

where y is the vector of −1s and 1s, indicating whether the label is unknown or positive for the corresponding training sample $x_i$, and $\hat{y}$ is a vector of probabilities between 0 and 1 for each training sample indicating a predicted probability that the corresponding training sample should have a positive label. As shown, when the training sample is unknown, that is $y_i$=−1, the associated PositiveLoss is zero, and the PositiveLoss for each positive training sample is −log(log ($\hat{y}_i$)). Thus, PositiveLoss penalizes the machine learning model for failing to accurately predict the positively labeled training samples.

A second loss component may incorporate knowledge of the approximate rate R and may penalize the model as predictions for individual training samples cause the distribution of positives in the semi-labeled training set to diverge from the expected distribution. That is, a value of the second loss component may increase as the predicted number of positives diverges from the expected number of positives given the known distribution. For example, a second loss component may be given by $$DistributionLoss(\hat{y}) = \left(\left(\frac{1}{N}\sum_{i=1}^{N}\hat{y}_i\right) - R_{\mathit{eff}}\right)^2.$$

A total loss for use in training the machine learning model may be based on both the first loss component and the second loss component. For example, the total loss may be given as TotalLoss(γ,$\hat{γ}$)=PositiveLoss(γ,$\hat{γ}$)+DistributionLoss ($\hat{γ}$).

The example implementations may also be used for solving regression problems, where the values of $y_i$ are continuous rather than binary, and we wish to train the machine learning model to predict values of y based on a set of training data including a first plurality of training samples which are labeled, that is for which $y_i$ is known, and a second plurality of training samples where $y_i$ is unknown. Rather than knowing a positivity rate R, a distribution is known for the second plurality of training samples. Training a machine learning model to solve this problem may have use in predicting asset values when only a small unrepresentative sample is known, but a distribution of a more relevant example is known. For example, consider predicting asset prices (such as house or vehicle prices) in a given city where a distribution of asset prices is known, but the known prices in the training data are from a different city, or only a small region of the given city.

Similarly to the previously discussed example, two loss components may be used for training the machine learning model for use in solving this regression problem. A first loss component may provide a loss for the labeled training samples (the first plurality of training samples) and may be based on a mean absolute error associated with the labeled samples. An example first loss factor may be given as $$LabeledLoss(y, \hat{y}) = \frac{1}{N_L}\sum_{i=1}^{N_L}|\hat{y}_i - y_i|,$$

where $N_L$ is the number of training samples in the first plurality of training samples.

A second loss component may provide a loss for the unlabeled training samples (the second plurality of training samples) and may penalize the model for deviation from the known distribution of the unknown samples. For example, the unknown training samples may be known to have a normal distribution with a known mean and standard deviation, or another known distribution. An example second loss component may then be given as $$UnlabeledLoss(\hat{y}) = \left(\left(\frac{1}{N_U}\sum_{i=1}^{N_U}\hat{y}_i\right) - \mu\right)^2 + \left(\left(\frac{1}{N_U-1}\sum_{i=1}^{N_U}(y_i-\mu)^2\right) - \sigma^2\right)^2,$$

where NU is the number of unlabeled training samples, μ is the mean of the known distribution, and σ is the standard deviation of the known distribution.

The total loss for use in training the machine learning model for solving the regression model may be based on both the first loss component and the second loss component. For example, the total loss may be given as RegressionLoss(γ,$\hat{γ}$)=LabeledLoss(γ,$\hat{γ}$)+UnlabeledLoss($\hat{γ}$).

Figure 3:
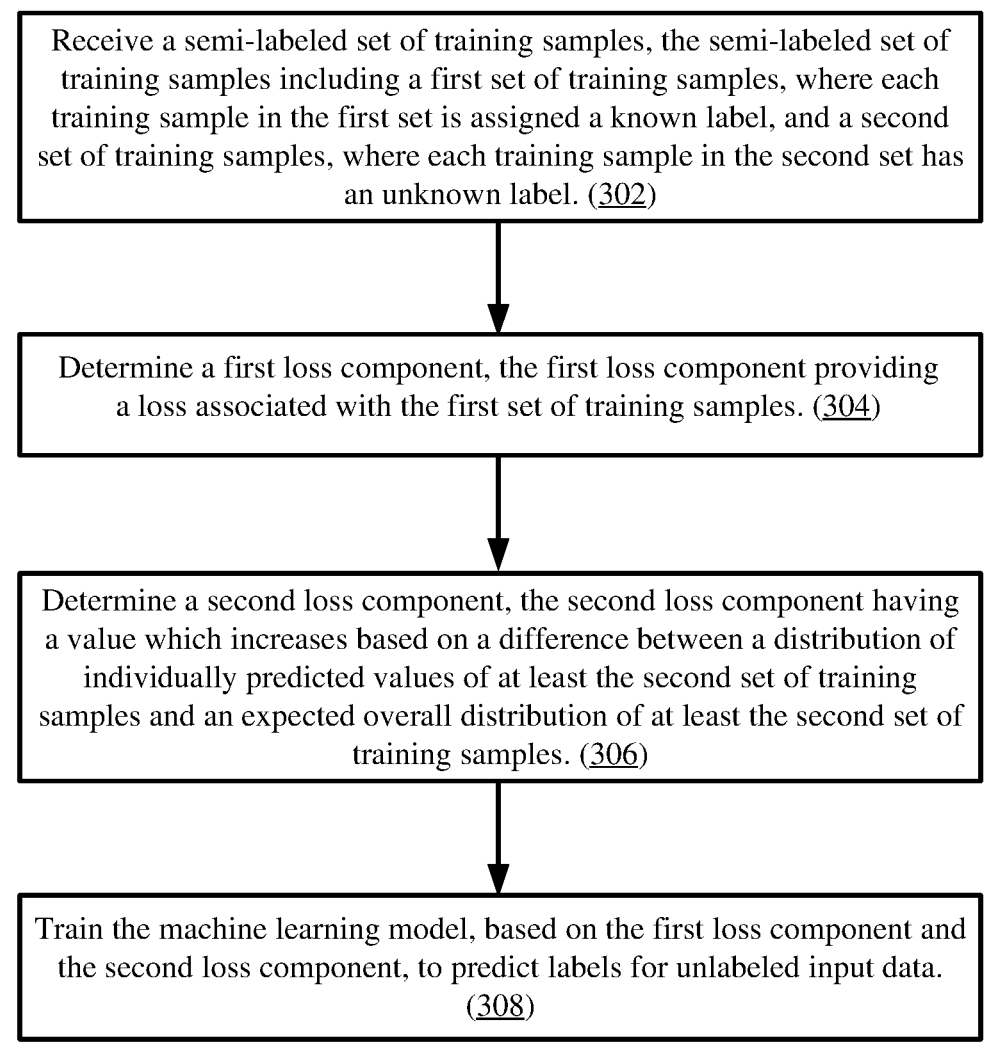
FIG. 3 shows an illustrative flow chart depicting an example operation for training a machine learning model to predict labels for input data, according to some implementations.

FIG. 3 shows an illustrative flow chart depicting an example operation 300 for training a machine learning model to predict labels for input data, according to some implementations. The example operation 300 may be performed by one or more processors of a computing device, and in some implementations, the example operation 300 may be performed using the machine learning training system 100 of FIG. 1. It is to be understood that the example operation 300 may be performed by any suitable systems, computers, or servers.

At block 302, the machine learning training system 100 receives a semi-labeled set of training samples, the semi-labeled set of training samples including a first set of training samples, where each training sample in the first set is assigned a known label, and a second set of training samples, where each training sample in the second set has an unknown label. At block 304, the machine learning training system 100 determines a first loss component, the first loss component providing a loss associated with the first set of training samples. At block 306, the machine learning training system 100 determines a second loss component, the second loss component having a value which increases based on a difference between a distribution of individually predicted values of at least the second set of training samples and an expected overall distribution of at least the second set of training samples. At block 308, the machine learning training system 100 trains the machine learning model, based on the first loss component and the second loss component, to predict labels for unlabeled input data.

In some aspects, the known label assigned to each training sample of the first set of training samples is a first value of a binary label, and each training sample of the second set of training samples has an unknown label including either the first value of the binary label or a second value of the binary label. In some aspects, the first loss component has a value of zero for each training sample of the second set of training samples. In some aspects, the first loss component is given by $$PositiveLoss(y, \hat{y}) = \frac{1}{P} \sum_{\forall i \, where \, y_i = 1} (1 - \hat{y}_i),$$

where $\gamma$ is a vector of length N, where each element $\gamma_i$ in $\gamma$ has a value of 1 for training samples belonging to the first set of training samples, and a value of $-1$ for training samples belonging to the second set of training samples, and $\hat{\gamma}$ is a vector of length N, such that each element $\hat{\gamma}_i$ in $\hat{\gamma}$ has a value between 0 and 1 corresponding to a probability that the corresponding training sample is assigned the first value of the binary label by the machine learning model. In some aspects, the expected distribution of at least the second set of training samples includes an expected proportion of the training samples in the semi-labeled set having the first value of the binary label. In some aspects, the expected proportion is given by $$R_{eff} = \frac{P + R * U}{N},$$

where P is the number of training samples in the first set of training samples, U is the number of training samples in the second set of training samples, N is a total number of training samples in the semi-labeled set of training samples, and R is the proportion of the training samples in the second set of training samples having the first value of the binary label. In some aspects, the second loss component is given by $$DistributionLoss(\hat{y}) = \left(\left(\frac{1}{N}\sum_{i=1}^{N}\hat{y}_i\right) - R_{eff}\right)^2,$$

where $\hat{\gamma}$ is a vector of length N, such that each element $\hat{\gamma}_i$ in $\hat{\gamma}$ has a value between 0 and 1 corresponding to a probability that the corresponding training sample is assigned the first value of the binary label by the machine learning model.

In some aspects, the machine learning model is trained in block 308 based on a sum of the first loss component and the second loss component.

In some aspects, the machine learning model is a deep neural network (DNN).

In some aspects, the known label assigned to each training sample of the first set of training samples is a corresponding value of a continuous label, and each training sample of the second set of training samples has an unknown value of the continuous label. In some aspects, the expected overall distribution of labels of at least the second set of training samples includes a known distribution of labels in the second set of training samples. In some aspects, the known distribution of labels includes a normal distribution having a known mean $\mu$ and a known standard deviation $\sigma$. In some aspects, the first loss component is a mean absolute error loss component providing a loss for the first set of training samples. In some aspects, the mean absolute error loss component is given by $$LabeledLoss(y, \hat{y}) = \frac{1}{N_L}\sum_{i=1}^{N_L}|\hat{y}_i - y_i|,$$

where $\gamma$ is a vector of length $N_L$, where each element $\gamma_i$ in $\gamma$ has a known value of the continuous label corresponding to the ith training sample of the first set of training samples, $\hat{\gamma}$ is a vector of length $N_L$, such that each element $\hat{\gamma}_i$ in $\hat{\gamma}$ has a predicted value of the continuous label corresponding to the ith training sample of the first set of training samples, and $N_L$ represents a total number of training samples in the first set of training samples. In some aspects, the second loss component provides a loss for the second set of training samples. In some aspects, the second loss component is given by $$UnlabeledLoss(\hat{y}) = \left(\left(\frac{1}{N_U}\sum_{i=1}^{N_U}\hat{y}_i\right) - \mu\right)^2 + \left(\left(\frac{1}{N_U - 1}\sum_{i=1}^{N_U}(y_i - \mu)^2\right) - \sigma^2\right)^2,$$

where $\hat{\gamma}$ is a vector of length $N_U$, such that each element $\hat{\gamma}_i$ in $\hat{\gamma}$ has a predicted value of the continuous label corresponding to the ith training sample of the second set of training samples, and $N_U$ represents a total number of training samples in the second set of training samples.

Figure 4:
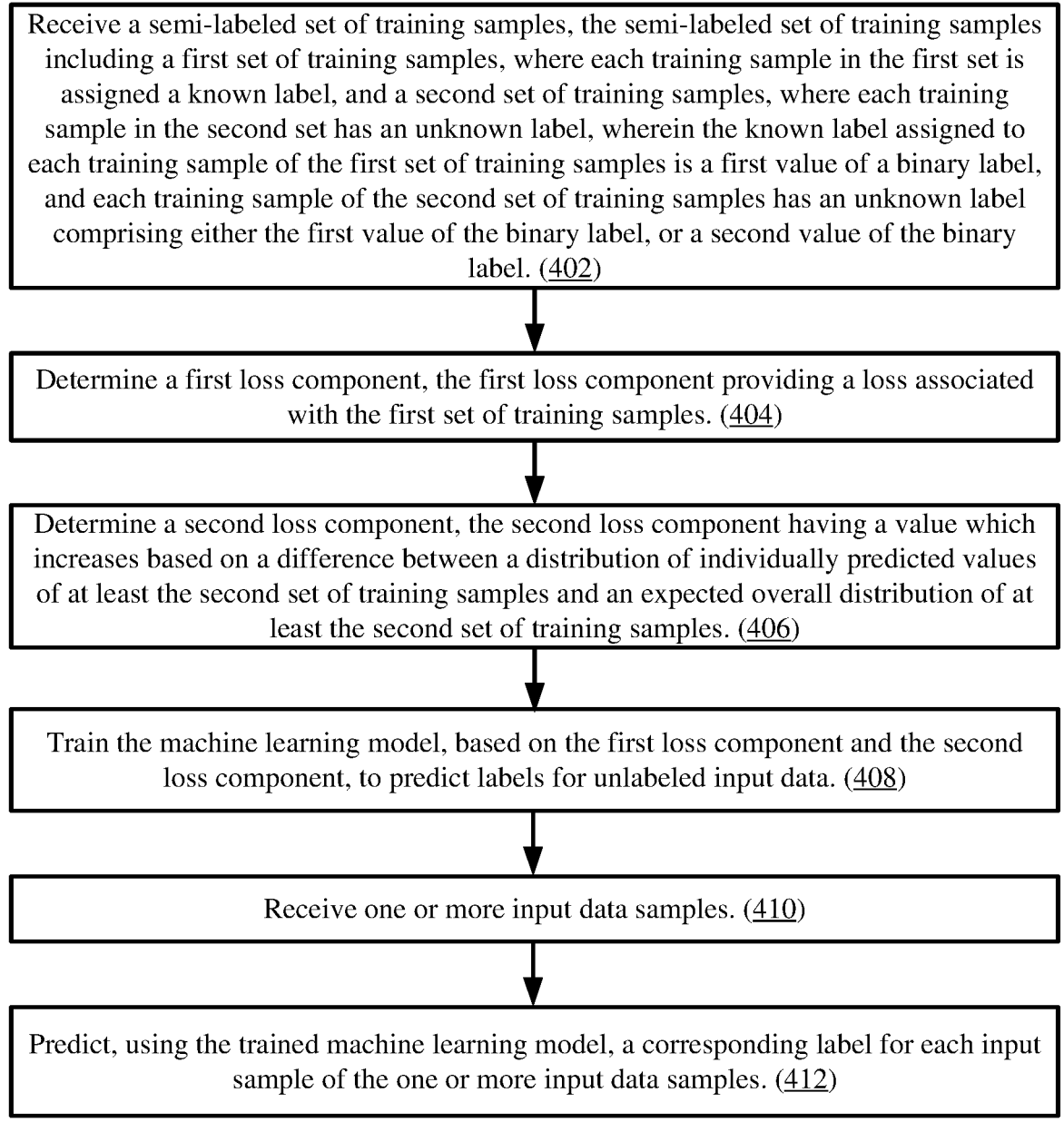
FIG. 4 shows an illustrative flow chart depicting an example operation for predicting labels for input data, according to some implementations.

FIG. 4 shows an illustrative flow chart depicting an example operation 400 for predicting labels for input data, according to some implementations. The example operation 300 may be performed by one or more processors of a computing device, and in some implementations, the example operation 300 may be performed using the machine learning training system 100 of FIG. 1. It is to be understood that the example operation 300 may be performed by any suitable systems, computers, or servers.

At block 402, the machine learning training system 100 receives a semi-labeled set of training samples, the semi-labeled set of training samples including a first set of training samples, where each training sample in the first set is assigned a known label, and a second set of training samples, where each training sample in the second set has an unknown label, wherein the known label assigned to each training sample of the first set of training samples is a first value of a binary label, and each training sample of the second set of training samples has an unknown label comprising either the first value of the binary label, or a second value of the binary label. At block 404, the machine learning training system 100 determines a first loss component, the first loss component providing a loss associated with the first set of training samples. At block 406, the machine learning training system 100 determines a second loss component, the second loss component having a value which increases based on a difference between a distribution of individually predicted values of at least the second set of training samples and an expected overall distribution of at least the second set of training samples. At block 408, the machine learning training system 100 trains the machine learning model, based on the first loss component and the second loss component, to predict labels for unlabeled input data. At block 410, the machine learning training system 100 receives one or more input data samples. At block 412, the machine learning training system 100 predicts, using the trained machine learning model, a corresponding label for each input data sample of the one or more input data samples.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of training a machine learning model to predict labels for input data, the method performed by an electronic device coupled to the machine learning model and comprising:

receiving a semi-labeled set of training samples, the semi-labeled set of training samples including a first set of training samples, where each training sample in the first set is assigned a known label, and a second set of training samples, where each training sample in the second set has an unknown label, wherein the known label assigned to each training sample of the first set of training samples is a first value of a binary label, and each training sample of the second set of training samples has an unknown label comprising either the first value of the binary label, or a second value of the binary label;

determining a first loss component, the first loss component providing a loss associated with the first set of training samples, the first loss component given by:

$$PositiveLoss(y, \hat{y}) = \frac{1}{P} \sum_{\forall i\ where\ y_i = 1} (1 - \hat{y}_i),$$

where $\gamma$ is a vector of length N, where each element $\gamma_i$ in $\gamma$ has a value of 1 for training samples belonging to the first set of training samples, and a value of $-1$ for training samples belonging to the second set of training samples, P is a number of training samples in the first set of training samples, and $\hat{\gamma}$ is a vector of length N, such that each element $\hat{\gamma}_i$ in $\hat{\gamma}$ has a value between 0 and 1 corresponding to a probability that a corresponding training sample is assigned the first value of the binary label by the machine learning model;

determining a second loss component, the second loss component having a value which increases based on a difference between a distribution of individually predicted values of least the second set of training samples and an expected overall distribution of at least the second set of training samples; and training the machine learning model, based on the first loss component and the second loss component, to predict labels for unlabeled input data.

2. The method of claim 1, wherein the first loss component has a value of zero for each training sample of the second set of training samples.

3. The method of claim 1, wherein the expected distribution of at least the second set of training samples comprises an expected proportion of the training samples in the semi-labeled set having the first value of the binary label.

4. The method of claim 3, wherein the expected proportion is given by $$R_{eff} = \frac{P + R*U}{N},$$

where P is a number of training samples in the first set of training samples, U is a number of training samples in the second set of training samples, N is a total number of training samples in the semi-labeled set of training samples, and R is the expected proportion of the training samples in the second set of training samples having the first value of the binary label.

5. The method of claim 4, wherein the second loss component is given by $$DistributionLoss(\hat{y}) = \left(\left(\frac{1}{N}\sum_{i=1}^{N}\hat{y}_i\right) - R_{eff}\right)^2,$$

where $\hat{\gamma}$ is a vector of length N, such that each element $\hat{\gamma}_i$ in $\hat{\gamma}$ has a value between 0 and 1 corresponding to a probability that the corresponding training sample is assigned the first value of the binary label by the machine learning model.

6. The method of claim 1, wherein training the machine learning model is based on a sum of the first loss component and the second loss component.

7. The method of claim 1, wherein the machine learning model is a deep neural network (DNN).

8. A system for training a machine learning model to predict labels for input data, the system associated with the machine learning model and comprising:

one or more processors; and a memory storing instructions that, when executed by the one or more processors, cause the system to perform operations comprising:

receiving a semi-labeled set of training samples, the semi-labeled set of training samples including a first set of training samples, where each training sample in the first set is assigned a first value of a binary label, and a second set of training samples, where each training sample in the second set has an unknown label comprising either the first value of the binary label, or a second value of the binary label;

determining a first loss component, the first loss component providing a loss associated with the first set of training samples, the first loss component given by:

$$PositiveLoss(y, \hat{y}) = \frac{1}{P}\sum_{\forall i\, where\, y_i=1}(1 - \hat{y}_i),$$

where $\gamma$ is a vector of length N, where each element $\gamma_i$ in $\gamma$ has a value of 1 for training samples belonging to the first set of training samples, and a value of −1 for training samples belonging to the second set of training samples, P is a number of training samples in the first set of training samples, and $\hat{\gamma}$ is a vector of length N, such that each element $\hat{\gamma}_i$ in $\hat{\gamma}$ has a value between 0 and 1 corresponding to a probability that a corresponding training sample is assigned the first value of the binary label by the machine learning model;

determining a second loss component, the second loss component having a value which increases based on a difference between a distribution of individually predicted values of least the second set of training samples and an expected overall distribution of at least the second set of training samples; and training the machine learning model, based on the first loss component and the second loss component, to predict labels for unlabeled input data.

9. A method of predicting labels for input data, the method performed by an electronic device coupled to a machine learning model and comprising:

receiving a semi-labeled set of training samples, the semi-labeled set of training samples including a first set of training samples, where each training sample in the first set is assigned a known label, and a second set of training samples, where each training sample in the second set has an unknown label, wherein the known label assigned to each training sample of the first set of training samples is a corresponding value of a continuous label, and each training sample of the second set of training samples has an unknown value of the continuous label;

determining a first loss component, the first loss component providing a loss associated with the first set of training samples;

determining a second loss component providing a loss for the second set of training samples, the second loss component having a value which increases based on a difference between a distribution of individually predicted values of least the second set of training samples and a known normal distribution of labels of the second set of training samples having a known mean μ and a known standard deviation a, the second loss component given by $$UnlabeledLoss(\hat{y}) =$$

$$\left(\left(\frac{1}{N_U}\sum_{i=1}^{N_U}\hat{y}_i\right) - \mu\right)^2 + \left(\left(\frac{1}{N_U-1}\sum_{i=1}^{N_U}(y_i-\mu)^2\right) - \sigma^2\right)^2,$$

where $\hat{\gamma}$ is a vector of length $N_U$, such that each element $\hat{\gamma}_i$ in $\hat{\gamma}$ has a predicted value of the continuous label corresponding to an ith training sample of the second set of training samples, and $N_U$ represents a total number of training samples in the second set of training samples;

training the machine learning model, based on the first loss component and the second loss component, to predict labels for unlabeled input data;

receiving one or more input data samples; and predicting, using the trained machine learning model, a corresponding label for each input data sample of the one or more input data samples.

10. The method of claim 9, wherein the first loss component is a mean absolute error loss component providing a loss for the first set of training samples.

11. The method of claim 10, wherein the mean absolute error loss component is given $$LabeledLoss(y, \hat{y}) = \frac{1}{N_L}\sum_{i=1}^{N_L}|\hat{y}_i - y_i|,$$

by where $\gamma$ is a vector of length $N_L$, where each element $\gamma_i$ in $\gamma$ has a known value of the continuous label corresponding to an ith training sample of the first set of training samples, $\hat{\gamma}$ is a vector of length $N_L$, such that each element $\hat{\gamma}_i$ in $\gamma$ has a predicted value of the continuous label corresponding to the ith training sample of the first set of training samples, and $N_L$ represents a total number of training samples in the first set of training samples.

12. The system of claim 8, wherein the first loss component has a value of zero for each training sample of the second set of training samples.

13. The system of claim 8, wherein the expected distribution of at least the second set of training samples comprises an expected proportion of the training samples in the semi-labeled set having the first value of the binary label.

14. The system of claim 13, wherein the expected proportion is given by $$R_{eff} = \frac{P + R*U}{N},$$

where P is a number of training samples in the first set of training samples, U is a number of training samples in the second set of training samples, N is a total number of training samples in the semi-labeled set of training samples, and R is the expected proportion of the training samples in the second set of training samples having the first value of the binary label.

15. The system of claim 14, wherein the second loss component is given by $$DistributionLoss(\hat{y}) = \left(\left(\frac{1}{N}\sum_{i=1}^{N}\hat{y}_i\right) - R_{eff}\right)^2,$$

where $\hat{\gamma}$ is a vector of length N, such that each element $\hat{\gamma}_t$ in $\hat{\gamma}$ has a value between 0 and 1 corresponding to a probability that the corresponding training sample is assigned the first value of the binary label by the machine learning model.

16. The system of claim 8, wherein training the machine learning model is based on a sum of the first loss component and the second loss component.

17. The system of claim 8, wherein the machine learning model is a deep neural network (DNN).

* * * * *